Sept. 13, 1966   E. J. GOLDMAN   3,272,472
COMPOSITE SEALING RING

Original Filed Feb. 19, 1962   2 Sheets—Sheet 1

INVENTOR.
EDWARD J. GOLDMAN
BY
Dike, Thompson, Bronstein & Mrose
ATTORNEYS

Sept. 13, 1966   E. J. GOLDMAN   3,272,472
COMPOSITE SEALING RING
Original Filed Feb. 19, 1962   2 Sheets-Sheet 2

INVENTOR.
EDWARD   J.   GOLDMAN
BY
*Dike, Thompson, Bronstein & Mrose*
ATTORNEYS

United States Patent Office 3,272,472
Patented Sept. 13, 1966

3,272,472
COMPOSITE SEALING RING
Edward J. Goldman, Randolph, Mass., assignor to Walworth Company, New York, N.Y., a corporation of Massachusetts
Original application, Feb. 19, 1962, Ser. No. 174,052. Divided and this application June 9, 1965, Ser. No. 467,178
3 Claims. (Cl. 251—172)

This is a division of application Serial No. 174,052, filed February 19, 1962, now abandoned.

My present invention relates to valves of the ball valve type and is especially adapted to embodiment in valves of large size. In such valves it is desirable to make the valve body in two identical halves secured together along a plane transverse to the line of flow through the valve i.e. from the inlet side to the outlet side. Making the valve with two identical halves reduces the expense of manufacturing, assembling and storage since it is not necessary to make and keep in stock two different parts of large size. However, difficult problems of sealing and packing arise when the bodies of such valves are made in two separate pieces.

In such a valve it is desirable to use as a movable valve member, conveniently referred to as a "ball," mounted on trunnions journaled in bearings at the plane of separation of the two halves of the body and to make the trunnions integral with or rigidly fixed to the ball.

When the valve member or ball is mounted on affixed stems or trunnions acting as a single unit with the valve member the problem of packing to prevent leakage past the ball is entirely different from the problem of preventing leakage through a valve in which the valve member is slightly movable lengthwise of the flow passage such as is shown in O'Stroske Pat. No. 1,616,386. Integral or unitary trunnions are desirable because the forces required to turn such a valve member are much less than those forces required where the valve member is capable of movement lengthwise of the line of flow. This is because in a valve with integral or rigidly affixed trunnions the chief areas of friction are about the trunnions, while in a valve with a separate stem the valve member is movable lengthwise and the chief area of friction is where the ball seats on the body or packing and therefore the radius over which the turning force must be exerted is much greater than it is where the force has to be exerted over a radius which is only one-half the diameter of the stem. While the invention is applicable to valves in which the trunnions are not unitary or rigidly affixed with the valve member, i.e. a separate stem, the usefulness of the invention is much greater when used in connection with a valve in which the valve member and the trunnions act as a single unit.

In my improved valve leakage between the halves of the body and around the stem or trunnions is prevented by a single ring of elastic material having a hole or holes with raised flanges about their edges through which the stem or trunnions pass. When in place between the halves of the body, and the halves are bolted together, the elastic packing is compressed and the pressure on the ring portion of the packing also squeezes it against the stem or trunnions, thereby preventing leakage around them as well as leakage between the halves of the body. At the same time the line pressure on the flanges forces them into sealing contact against the stem or trunnions.

In those cases wherein trunnions are integral or rigidly fixed with the movable valve member, the valve member is not free to move against its seats to provide tighter sealing and thereby to prevent leakage about the valve member. Accordingly, I provide at least on the intended inflow side, a sealing ring which is movable slightly toward and away from the spherical portion of the ball and is forced against it by the pressure in the line. For this purpose I have devised a movable sealing ring which, in a preferred embodiment, is composed of a metal ring embracing an elastic ring, the whole being so shaped and located in the body that the pressure of the incoming liquid may find its way around the back of the sealing ring and force the sealing ring as a whole against the spherical surface of the ball. In practice I provide another similar sealing ring on the opposite side of the ball. While sealing is accomplished primarily by the sealing ring on the inflow side of the ball, the second ring also helps to prevent leakage around the ball, and produces a similar main sealing action when flow is in the reverse direction. The ability of the sealing rings to seal on the inflow or higher pressure side of the ball can be utilized in other ways. For example, in order to prevent a fluid on one side of the valve from mixing with a different fluid on the other side, it is only necessary to "bleed" or drain fluid from the valve body between the two sealing rings. Both sealing rings will then have an inward acting pressure differential across them. This will cause them to seal against leakage of fluid from either side into the body cavity, thereby preventing mixing of the two fluids.

Referring to the drawings.

Figure 1:
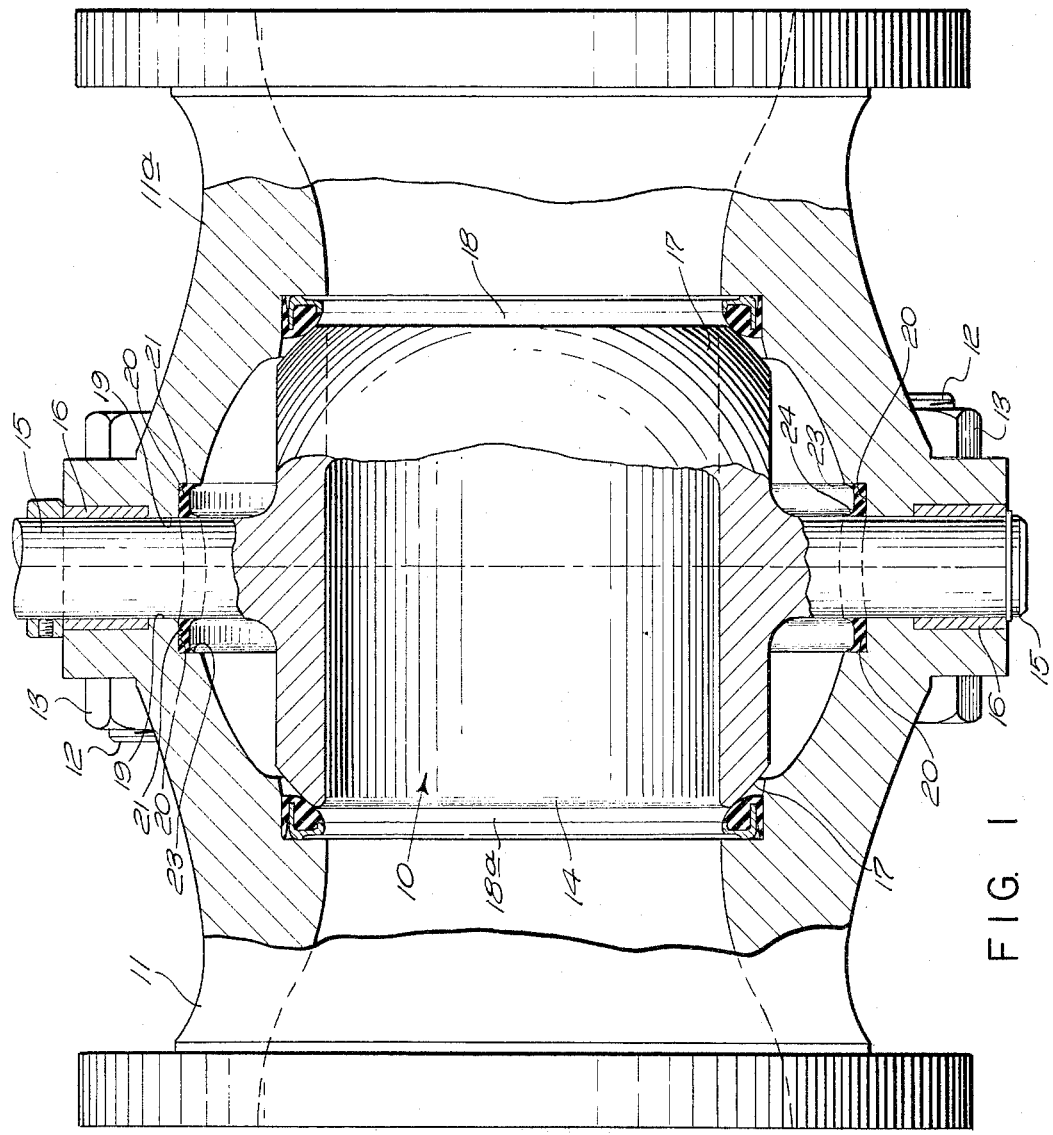
FIGURE 1 is a longitudinal section of the valve embodying my invention, the ball and trunnions and some other parts being shown partly in section and partly in elevation.
Figure 2:
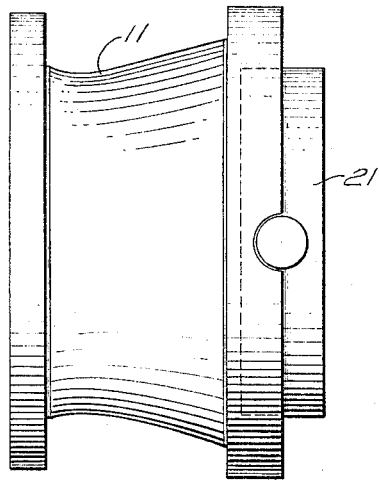
FIGURE 2 is a side elevation of one-half of the valve body with the packing ring in place.

Referring now particularly to FIGURE 1 at 11 and 11a are shown the two halves of the valve. These parts are held together forcibly by bolts and nuts at 12 and 13. At 14 is shown the valve member or valve mount and two integral trunnions 15—15. At 16, 16 are shown trunnion bearings inserted in the halves of the valve body. The valve member 14 has a cylindrical passage 10 through it, this passage being adequate to carry the flow through the valve. The exterior of the valve member 14 can be considered to be a ball or sphere. This spherical surface, 17, is in contact with sealing rings 18 which will be described in detail hereafter.

Figure 3:
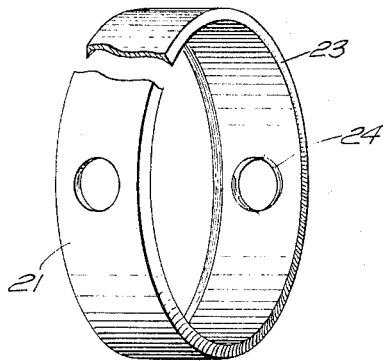
FIGURE 3 is a view in perspective of the packing ring.

The halves 11 and 11a have contacting faces 19 and the halves are formed with annular grooves 20 to receive a sealing ring 21. This sealing ring 21 is shown more completely in FIGURE 3. The inside surface is provided with outwardly-flaring ribs or flanges 23 at the edges and these lie against and are pre-loaded towards the sides of the grooves 20. The inside of the ring 21 is subjected to the pressure in the line and therefore the sealing ring 21 is expanded forcibly into the grooves 20 and at the same time the outer flanges 23 are pressed against the side walls of the grooves 20. There is also a flange 24 surrounding the hole or holes through which the stems in the form of trunnions 15 pass, and this flange presses against the sides of the trunnions 15 so that a tight seal is made around the trunnions 15—15. Therefore, a single sealing ring is effective to prevent leakage between the halves of the body and around the trunnions.

Figure 4:
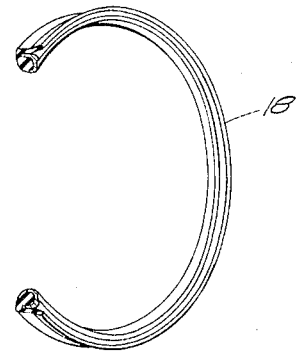
FIGURE 4 is a view partly in perspective and partly in section of a composite sealing ring.
Figure 5:
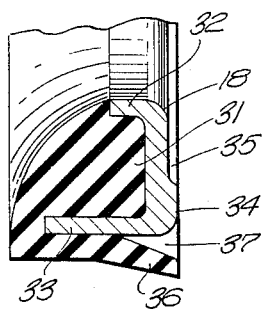
FIGURE 5 is a section on line 5—5 of FIGURE 4 the parts being shown in the position they occupy before the sealing ring is put in place in the valve body.
Figure 6:
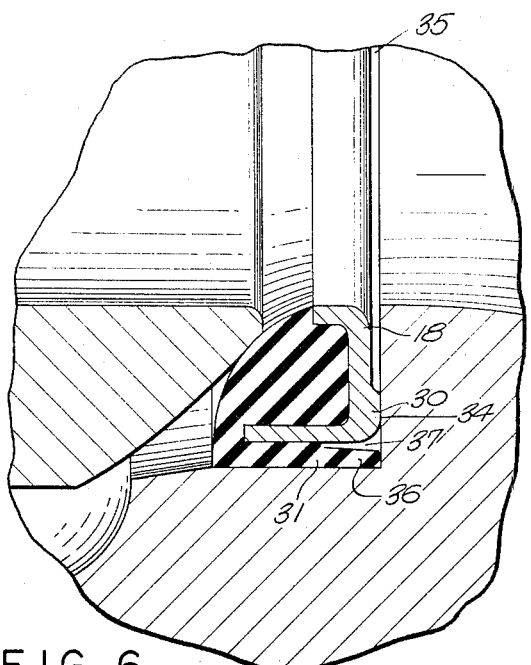
FIGURE 6 is a section showing the sealing ring and adjacent portions of the valve body and ball in the position they occupy when in position in the assembled valve.

FIGURES 4, 5 and 6 show in detail the construction of the valve seat on the incoming side. This valve seat is a composite structure comprising a grooved metal ring 30 and a partly enclosed sealing member 31 of elastic material. The metal ring 30 is formed with two flanges 32 and 33 the inner of which 32 is shorter than the outer 33. Between them is a space which partly encloses a portion of the elastic sealing member 31. The metal ring 30 is also formed with a ridge or rib 34 which when the sealing member is in place, rests against the face of the groove in the body member, leaving a space 35 between the face of the body member and the corresponding portion of the metal ring 30. The elastic sealing member 31 is formed with a leg or flange 36 which flares outwardly leaving a space 37 between it and the side of the flange 35. This space 37 is enclosed by the inner surface of the flange 36, the outer surface of the metal ring 30 and a portion of the wall of the body 11a. When the composite sealing member 30 is forced into position in the groove in the body member, the flange or rib 36 is bent inwardly toward the metal ring 30, but there is still a small space left as described. As will be seen the space 35 is open to the flow through the line and therefore pressure in the line can tend to force the composite sealing member 18 toward the valve and at the same time leave a tiny space between the rib and the wall of the body member. This permits flow from the line to enter the space 37 and compress the flange or rib 36 against the wall of the body. The result is that the composite sealing ring forms an effective seal against leakage past the ball valve 15 and simultaneously seals the sealing ring against leakage between it and the body member.

In practice I employ a second composite sealing ring identical with the one already described on the outflow side of the ball, a second sealing ring 18a, but as already pointed out the principal sealing effect is due to the sealing ring on the inflow side of the ball.

I claim:

1. A composite sealing ring adapted to be inserted in a cylindrical recess of one cooperating member for sealing with another cooperating member, said sealing ring comprising a metal backing ring U-shaped in cross section and having an inner and outer peripheral rib with a groove therebetween, the outer rib being substantially cylindrical and longer than the inner rib, and an elastic compressible sealing member having a body in the groove of the backing ring and a flange projecting outwardly away from the outer rib of the backing ring, said flange being disposed to make sealing contact with and to be forced radially inwardly of the ring by surrounding surfaces defining the recess in the one cooperating member in which it is inserted, said sealing member having a face exposed in front of the groove in position to provide contact and sealing with the other cooperating member.

2. A composite sealing ring as set forth in claim 1 in which the metal ring is formed with an annular depression in the portion thereof between said ribs, said portion being disposed for contact with the one cooperating member when inserted therein, whereby fluid pressure on the closed side of the U-shaped metal backing ring tends to force the composite sealing ring in direction axially thereof such that it may engage the other cooperating member.

3. A composite sealing ring as set forth in claim 1 in which the adjacent inner surface of the flange and outer surface of the outer rib of the metal ring are spaced apart and are disposed to remain spaced apart when the composite ring is inserted in the cylindrical recess in the one cooperating member, whereby fluid pressures in the spaces between said surfaces tend to force said flange toward the surrounding surfaces of the recess in the one cooperating member.

References Cited by the Examiner

UNITED STATES PATENTS

| | | | |
|---|---|---|---|
| 2,373,628 | 4/1945 | Gleeson | 251—315 |
| 3,096,786 | 7/1963 | Rost | 251—315 X |
| 3,130,952 | 4/1964 | Meyer | 251—317 X |

WILLIAM F. O'DEA, *Primary Examiner.*

CLARENCE R. GORDON, *Examiner.*